US008270479B2

(12) United States Patent
Morad et al.

(10) Patent No.: US 8,270,479 B2
(45) Date of Patent: Sep. 18, 2012

(54) SYSTEM AND METHOD FOR VIDEO AND AUDIO ENCODING ON A SINGLE CHIP

(75) Inventors: Amir Morad, Tel Aviv (IL); Leonid Yavits, Herzliya (IL); Gadi Oxman, Tel-Aviv (IL); Evgeny Spektor, Petach Tikva (IL); Michael Khrapkovsky, Hezliya (IL); Gregory Chernov, Herzliya (IL)

(73) Assignee: Broadcom Corporation, Irvine, CA (US)

( * ) Notice: Subject to any disclaimer, the term of this patent is extended or adjusted under 35 U.S.C. 154(b) by 1169 days.

(21) Appl. No.: 10/170,019

(22) Filed: Jun. 11, 2002
(Under 37 CFR 1.47)

(65) Prior Publication Data

US 2003/0108105 A1    Jun. 12, 2003

Related U.S. Application Data

(63) Continuation-in-part of application No. 09/543,904, filed on Apr. 6, 2000, now Pat. No. 6,690,726.

(60) Provisional application No. 60/296,766, filed on Jun. 11, 2001, provisional application No. 60/296,768, filed on Jun. 11, 2001.

(30) Foreign Application Priority Data

Apr. 6, 1999  (IL) .......................................... 129345

(51) Int. Cl.
*H04B 1/66*  (2006.01)
(52) U.S. Cl. ................................ 375/240.12
(58) Field of Classification Search ................................
375/240.01–240.28; 345/204; 709/247; 710/20;
725/95; 348/14.08, 14.13, 558, 416.1; 370/395.2;
*H04B 1/66*
See application file for complete search history.

(56) References Cited

U.S. PATENT DOCUMENTS

| | | | | | |
|---|---|---|---|---|---|
| 5,159,447 | A | * | 10/1992 | Haskell et al. | 375/240.05 |
| 5,625,693 | A | * | 4/1997 | Rohatgi et al. | 713/187 |
| 5,663,962 | A | * | 9/1997 | Caire et al. | 370/535 |
| 5,719,630 | A | * | 2/1998 | Senda | 375/240.17 |
| 5,764,803 | A | * | 6/1998 | Jacquin et al. | 382/236 |
| 5,784,572 | A | * | 7/1998 | Rostoker et al. | 709/247 |
| 5,852,473 | A | * | 12/1998 | Horne et al. | 348/558 |
| 5,874,997 | A | * | 2/1999 | Haigh | 375/240.25 |
| 5,959,677 | A | * | 9/1999 | Date et al. | 375/240.01 |
| 5,963,256 | A | * | 10/1999 | Tahara | 348/385.1 |
| 5,982,459 | A | * | 11/1999 | Fandrianto et al. | 348/425.3 |
| 6,018,768 | A | * | 1/2000 | Ullman et al. | 709/218 |
| 6,121,998 | A | * | 9/2000 | Voois et al. | 348/14.13 |
| 6,124,882 | A | * | 9/2000 | Voois et al. | 348/14.08 |
| 6,157,674 | A | * | 12/2000 | Oda et al. | 375/240 |
| 6,297,794 | B1 | * | 10/2001 | Tsubouchi et al. | 345/204 |
| 6,347,344 | B1 | * | 2/2002 | Baker et al. | 710/20 |
| 6,466,258 | B1 | * | 10/2002 | Mogenis et al. | 348/143 |
| 6,490,250 | B1 | * | 12/2002 | Hinchley et al. | 370/232 |
| 6,493,388 | B1 | * | 12/2002 | Wang | 375/240.12 |
| 6,519,289 | B1 | * | 2/2003 | Bruck | 375/240.27 |
| 6,522,651 | B2 | * | 2/2003 | Herrmann | 370/395.2 |
| 6,665,872 | B1 | * | 12/2003 | Krishnamurthy et al. | 725/95 |
| 6,795,506 | B1 | * | 9/2004 | Zhang et al. | 375/240.26 |
| 6,823,013 | B1 | * | 11/2004 | Boice et al. | 375/240.17 |
| 6,845,107 | B1 | * | 1/2005 | Kitazawa et al. | 370/537 |
| 7,068,724 | B1 | * | 6/2006 | Hamilton | 375/240.26 |

* cited by examiner

*Primary Examiner* — Tung Vo
(74) *Attorney, Agent, or Firm* — Thomas, Kayden, Horstemeyer & Risley, LLP

(57) ABSTRACT

An apparatus is disclosed for performing real time video/audio encoding on a single chip. Within the single chip, a video encoder generates encoded video data from uncompressed video data and an audio encoder generates encoded audio data from uncompressed audio data. A mux processor within the single chip generates an output stream of encoded data from the encoded video data and the encoded audio data.

25 Claims, 9 Drawing Sheets

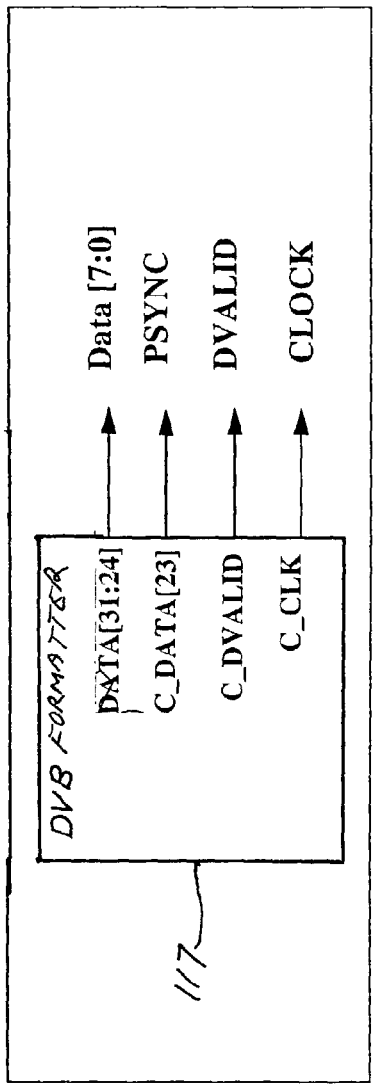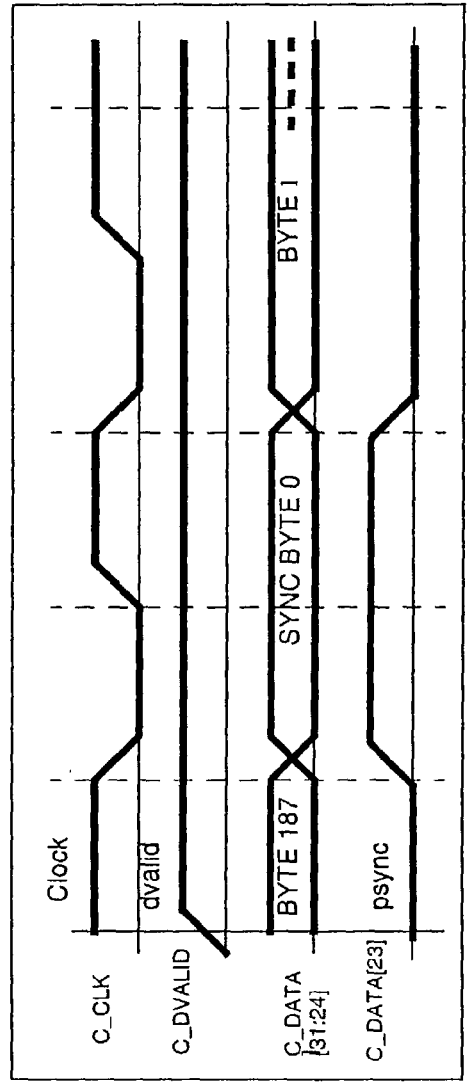
FIG. 8

SYSTEM AND METHOD FOR VIDEO AND AUDIO ENCODING ON A SINGLE CHIP

RELATED APPLICATIONS

This application is a continuation-in-part of U.S. patent application Ser. No. 09/543,904 filed Apr. 6, 2000, now U.S. Pat. No. 6,690,726 which claims the benefit of Israel Application Serial No. 129345 filed Apr. 6, 1999.

This application also makes reference to, claims priority to and claims the benefit of U.S. Provisional Patent Application Ser. No. 60/296,766 filed on Jun. 11, 2001 and U.S. Provisional Patent Application Ser. No. 60/296,768 filed on Jun. 11, 2001.

All of the above-listed patent applications are incorporated herein by reference in their entirety.

BACKGROUND OF THE INVENTION

Methods for encoding an audio-visual signal are known in the art. According to the methods, a video signal is digitized, analyzed and encoded in a compressed manner. The methods are implemented in computer systems, either in software, hardware or combined software-hardware forms.

Most hardware encoding systems consist of a set of semiconductor circuits arranged on a large circuit board. State of the art encoding systems include a single semiconductor circuit. Such a circuit is typically based on a high-power processor.

Reference is now made to FIG. 1, which is a block diagram illustration of a prior art video encoding circuit 10.

Encoding circuit 10 includes a video input processor 12, a motion estimation processor 14, a digital signal processor 16 and a bitstream processor 18. Processors 12-18, respectively, are generally connected in series.

Video input processor 12 captures and processes a video signal, and transfers it to motion estimation processor 14. Motion estimation processor 14 analyzes the motion of the video signal, and transfers the video signal and its associated motion analysis to digital signal processor 16. According to the data contained within the associated motion analysis, digital signal processor 16 processes and compresses the video signal, and transfers the compressed data to bitstream processor 18. Bitstream processor 18 formats the compressed data and creates therefrom an encoded video bitstream, which is transferred out of encoding circuit 10.

It will be appreciated by those skilled in the art that such an encoding circuit has several disadvantages. For example, one disadvantage of encoding circuit 10 is that bitstream processor 18 transfers the encoded video bitstream, data word by data word, directly to an element external to encoding circuit 10. Accordingly, each time such data word is ready, the encoded video data word is individually transferred to the external element. Transfer of the encoded video in such a fashion greatly increases the data traffic volume and creates communication bottlenecks in communication lines such as computer buses. Additionally, circuit 10 requires a dedicated storage/bus which is allocated on a full time basis, hence, magnifying these disturbances.

Another disadvantage is that encoding circuit 10 is able to perform the encoding of video signals, only. Usually, moving picture compression applications include multiframe videos and their associated audio paths. While the encoding circuit 10 performs video compression and encoding, the multiplexing of compressed video, audio and user data streams are performed separately. Such an approach increases the data traffic in the compression system and requires increased storage and processing bandwidth requirements, thereby greatly increasing the overall compression system complexity and cost.

Reference is now made to FIG. 2, which is a block diagram of a prior art video input processor 30, as may be typically included in encoding circuit 10. Video input processor 30 includes a video capture unit 32, a video preprocessor 34 and a video storage 36. The elements are generally connected in series.

Video capture unit 32 captures an input video signal and transfers it to video preprocessor 34. Video preprocessor 34 processes the video signal, including noise reduction, image enhancement, etc., and transfers the processed signal to the video storage 36. Video storage 36 buffers the video signal and transfers it to a memory unit (not shown) external to video input processor 30.

It will be appreciated by those skilled in the art that such a video input processor has several disadvantages. For example, one disadvantage of processor 30 is that it does not perform image resolution scaling. Accordingly, only original resolution pictures can be processed and encoded.

Another disadvantage is that processor 30 does not perform statistical analysis of the video signal, since in order to perform comprehensive statistical analysis a video feedback from the storage is necessary, thus allowing interframe (picture to picture) analysis, and processor 30 is operable in "feed forward" manner, only. Accordingly, video input processor 30 cannot detect developments in the video contents, such as scene change, flash, sudden motion, fade in/fade out, etc.

Reference is now made to FIG. 3 which is a block diagram illustration of a prior art video encoding circuit 50, similar to encoding circuit 10, however, connected to a plurality of external memory units. As an example, FIG. 3 depicts circuit 50 connected to a pre-encoding memory unit 60, a reference memory unit 62 and a post-encoding memory unit 64, respectively. Reference is made in parallel to FIG. 4, a chart depicting the flow of data within circuit 50.

Encoding circuit 50 includes a video input processor 52, a motion estimation processor 54, a digital signal processor 56 and a bitstream processor 58. Processors 54 to 58, respectively, are generally connected in series.

In the present example, video encoding circuit 50 operates under MPEG video/audio compression standards. Hence, for purposes of clarity, reference to a current frame refers to a frame to be encoded. Reference to a reference frame refers to a frame that has already been encoded and reconstructed, preferably by digital signal processor 56, and transferred to and stored in reference memory unit 62. Reference frames are compared to current frames during the motion estimation task, which is generally performed by motion estimation processor 54.

Video input processor 52 captures a video signal, which contains a current frame, or a plurality of current frames, and processes and transfers them to external pre-encoding memory unit 60. External pre-encoding memory unit 60 implements an input frame buffer (not shown) which accumulates and re-orders the frames according to the standard required for the MPEG compression scheme.

External pre-encoding memory unit 60 transfers the current frames to motion estimation processor 54. External reference memory unit 62 transfers the reference frames also to motion estimation processor 54. Motion estimation processor 54, reads and compares both sets of frames, analyzes the motion of the video signal, and transfers the motion analysis to digital signal processor 56.

Digital signal processor 56 receives the current frames from the external pre-encoding memory 60, and according to the motion analysis received from motion estimation processor 54, processes and compresses the video signal. Digital signal processor 56 then transfers the compressed data to the bitstream processor 58. Digital signal processor 56 further reconstructs the reference frame and stores it in reference memory 62. Bitstream processor 58 encodes the compressed data and transfers an encoded video bitstream to external post-encoding memory unit 64.

It will be appreciated by those skilled in the art that such an encoding circuit has several disadvantages. For example, one disadvantage of encoding circuit 50 is that a plurality of separate memory units are needed to support its operations, thereby greatly increasing the cost and complexity of any encoding system based on device 50.

Another disadvantage is that encoding circuit 50 has a plurality of separate memory interfaces. This increases the data traffic volume and the number of external connections of encoding circuit 50, thereby greatly increasing the cost and the complexity of encoding circuit 50. Another disadvantage is that encoder circuit 50 does not implement video and audio multiplexing, which is typically required in compression schemes.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Certain embodiments of the present invention provide an apparatus for performing video and audio encoding. In particular, certain embodiments provide for performing video and audio encoding on a single chip.

Apparatus of the present invention provides for performing real time video/audio encoding on a single chip. Within the single chip, a video encoder generates encoded video data from uncompressed video data and an audio encoder generates encoded audio data from uncompressed audio data. A mux processor within the single chip generates an output stream of encoded data from the encoded video data and the encoded audio data.

These and other advantages and novel features of the present invention, as well as details of an illustrated embodiment thereof, will be more fully understood from the following description and drawings.

BRIEF DESCRIPTION OF THE DRAWINGS

FIG. 8 is a block diagram and timing diagram illustrating the signals and timing output by a DVB formatter of the device in FIG. 5 in accordance with an embodiment of the present invention.

DETAILED DESCRIPTION OF THE INVENTION

An embodiment of the present invention provides a video/audio encoder on a single chip to generate compressed video and audio multiplexed into a transport stream. One embodiment of the encoder of the present invention supports MPEG standards and AC-3 standards, for example. With a single firmware change, however, the encoder may support any number of other standards as well. Applications for the encoder of the present invention may include personal video recorders, DVD recorders, set top box recorders, PC TV tuners, digital camcorders, video streaming, video conferencing, and game consoles.

Figure 1:
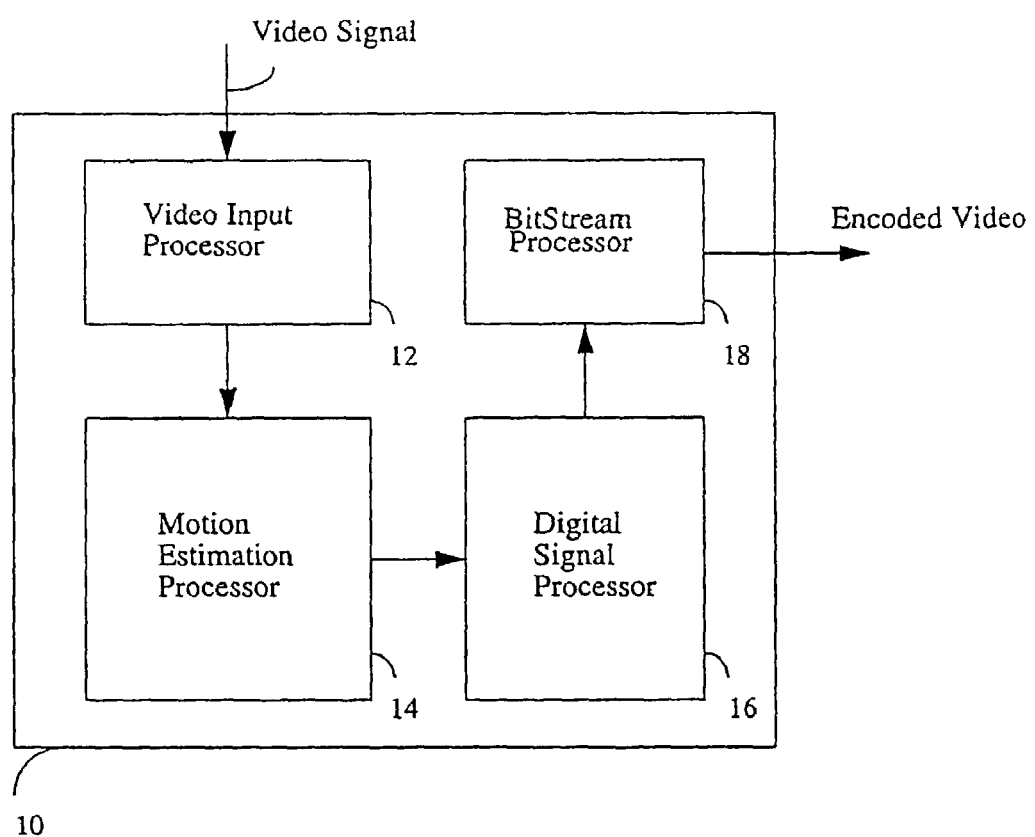
FIG. 1 is a block diagram of a prior art video encoding circuit.
Figure 2:
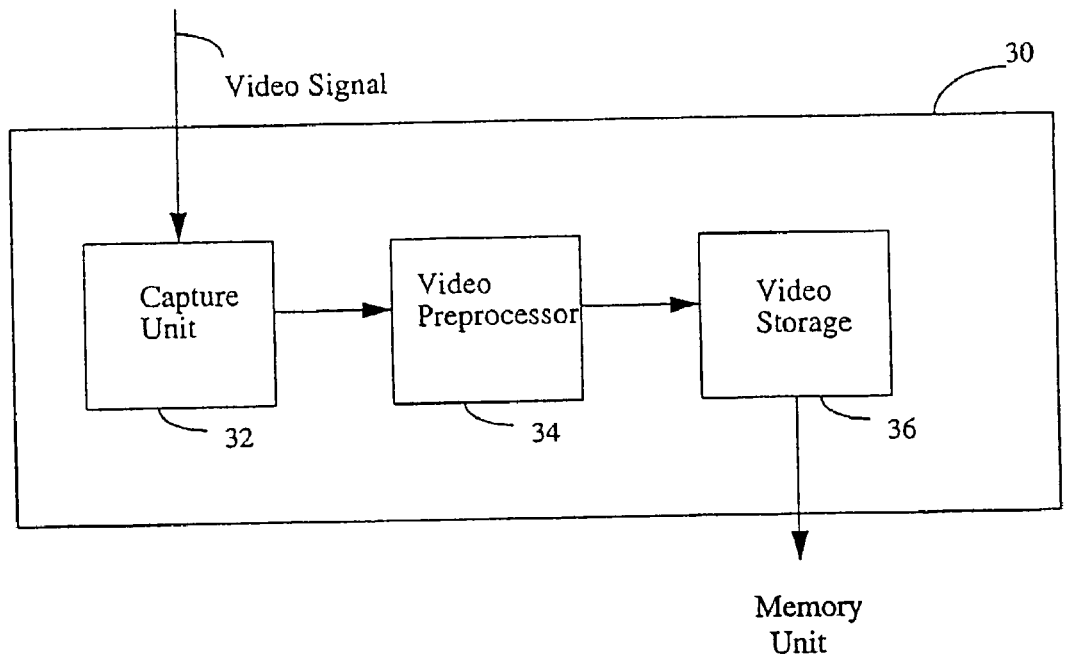
FIG. 2 is a block diagram of a prior art video input processor.
Figure 3:
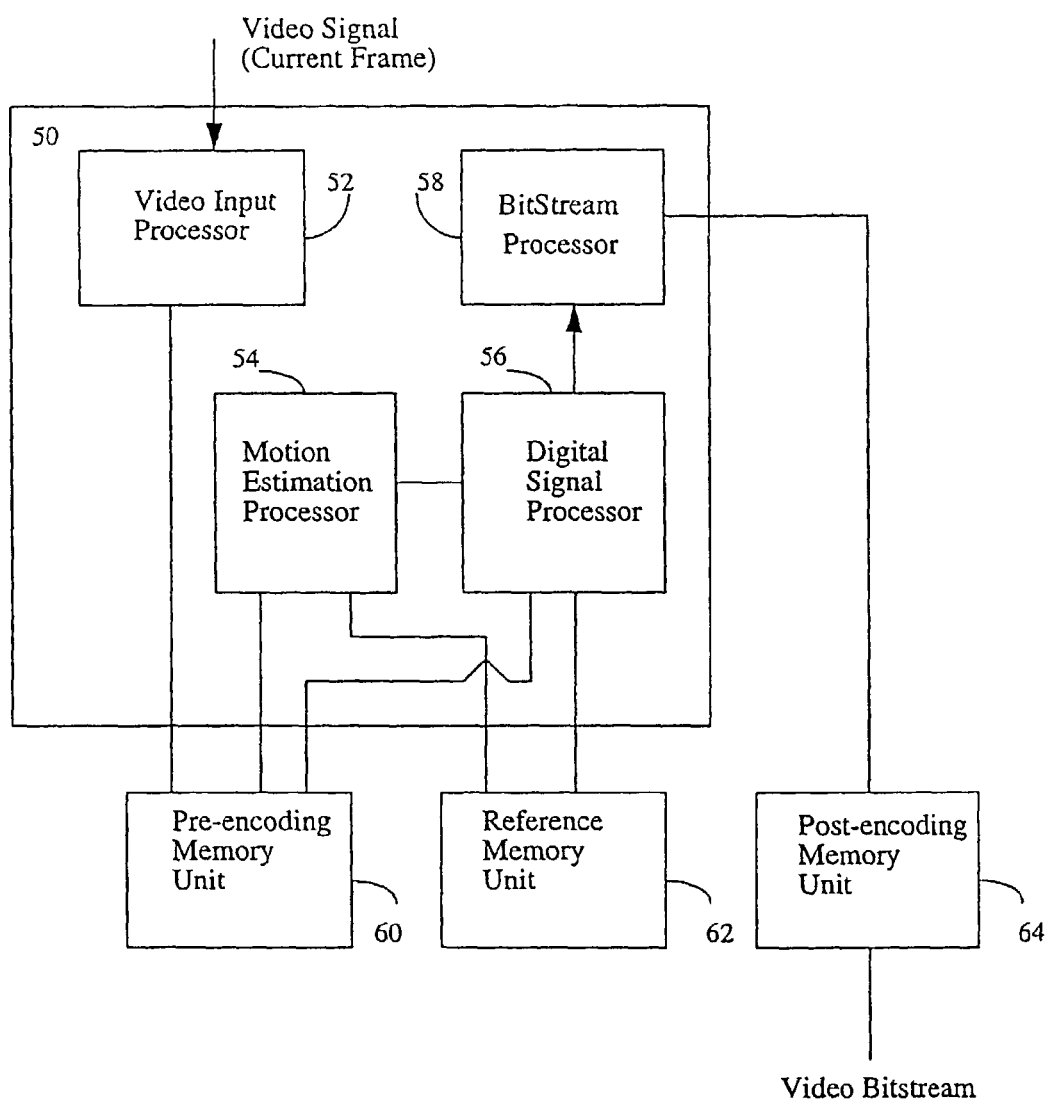
FIG. 3 is a block diagram of a prior art video encoding circuit linked to a plurality of external memory units.
Figure 4:
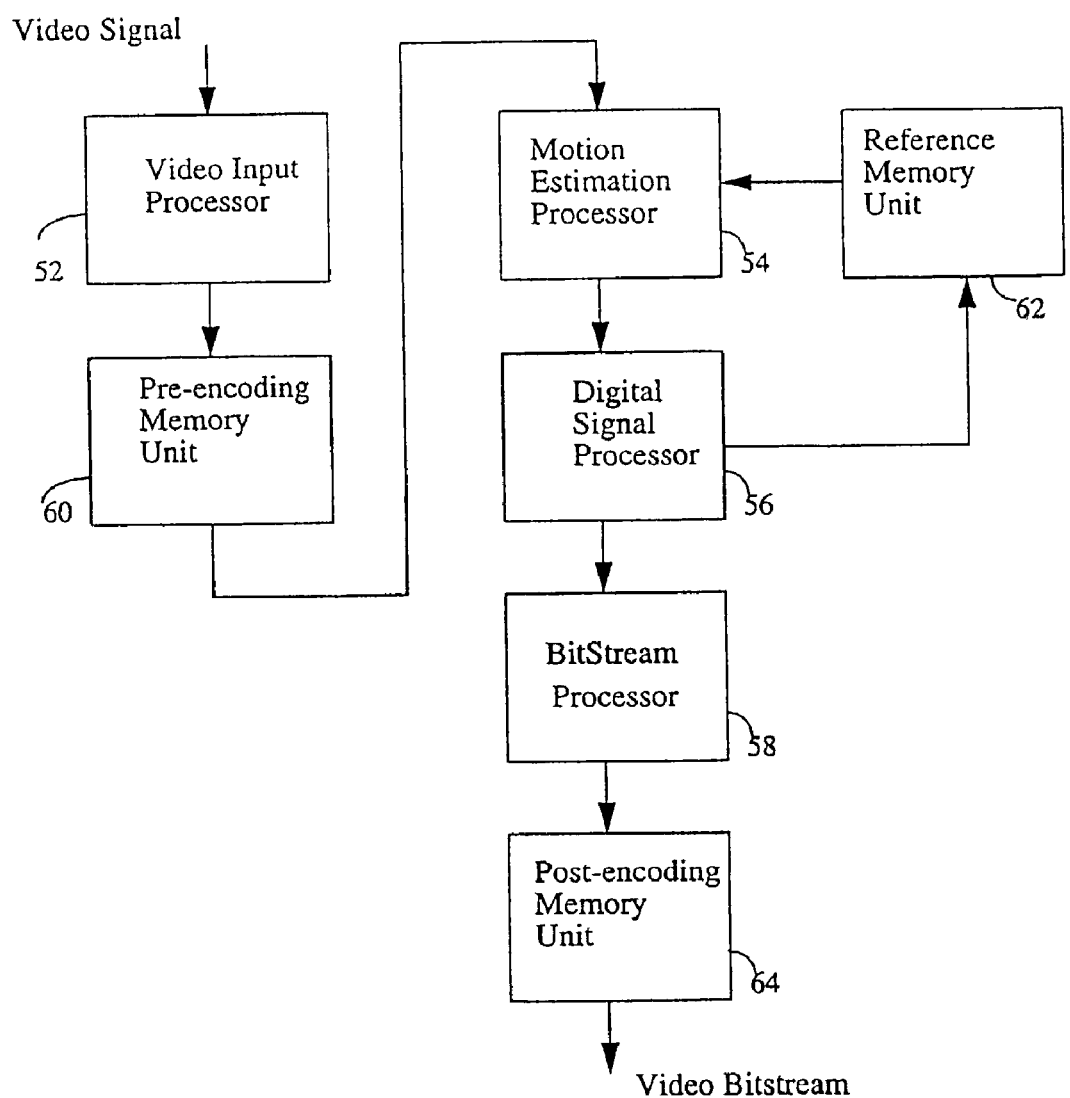
FIG. 4 is a flow chart of the data flow within the prior art circuit illustrated in FIG. 3.
Figure 5:
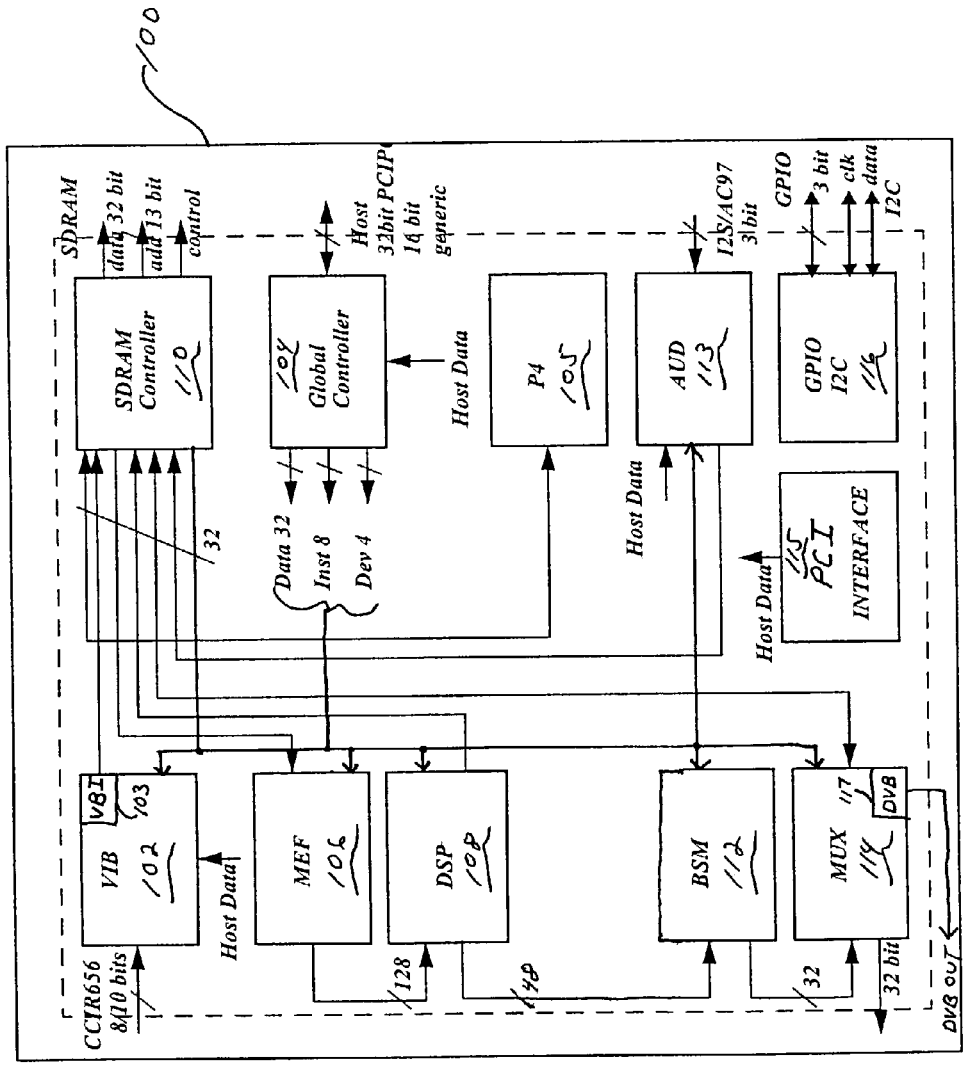
FIG. 5 is a block diagram of a video and audio encoding video/audio/data multiplexing device constructed and operative on a single chip in accordance with an embodiment of the present invention.

Reference is now made to FIG. 5, a block diagram of video encoding video/audio/data multiplexing device 100, constructed and operative in accordance with an embodiment of the present invention.

An embodiment of the present invention overcomes the disadvantage of the prior art by providing a novel approach to video/audio compression and encoding, and, as per this approach, a novel encoding device structure which comprises a plurality of processors with a defined, optimized work division scheme.

Typically, a sequence of compression commands are instructions or a sequence of instructions, such as, removal of temporal redundancy, removal of spatial redundancy, and entropy redundancy of data, and the like. Device 100 operates according to an optimized compression labor division, thus segmenting the compression tasks between the different processors and reducing, in comparison to prior art, the compression time.

According to an embodiment of the present invention, device 100 is a parallel digital processor implemented on a single chip and designed for the purposes of real-time video/audio compression and multiplexing, such as for MPEG encoding and the like. For purposes of clarity herein, multiplexing refers to the creating of synchronized streams of a plurality of unsynchronized audio and video streams. Device 100 may be incorporated in digital camcorders, recordable digital video disk (DVD), game machines, desktop multimedia, video broadcast equipment, video authoring systems, video streaming and video conferencing equipment, security and surveillance systems, and the like.

According to an embodiment of the present invention, device 100 efficiently performs video compression tasks such as removing temporal redundancy (i.e., motion between frames), spatial redundancy (i.e. motion within frame), and entropy redundancy of data. Device 100 has a plurality of processors, each processor designed to perform a segment of the compression task, hence, achieving optimal performance of each such task.

The number of processors, the architecture of each processor, and the task list per processor, achieves the optimal tradeoff between device implementation cost and efficiency.

In an embodiment of the present invention, device 100 incorporates both video encoding and audio encoding on a single chip. Device 100 includes a video input buffer (VIB) 102, a global controller 104, motion estimation processors P4 105 and MEF 106, a digital signal processor (DSP) 108, a memory controller 110, a bitstream processor (BSM) 112, an audio encoder (AUD) 113, a multiplexing processor (MUX) 114, a PCI interface 115, and a I2C/GPIO interface 116.

Together, the VIB 102, MEF 106, P4 105, DSP 108, and BSM 112 constitute a video encoder in an embodiment of the present invention.

Device 100 may be connectable to an external video interface, an external audio interface, an external memory unit, and an external host interface. Typically, for example, the video interface supplies a digital video signal in CCIR 656 format and the audio interface supplies a digital audio signal in I2S/AC97 formats.

The host interface typically connects to an external host (not shown) and acts as a user interface between device 100 and the user. The host interface accepts microcodes, commands, data parameters and the like received from a user or a supervising system. The host interface also transfers information from device 100 to the user. The host interface provides access to the compressed data and may be used to transfer uncompressed digitized video and/or audio and/or user data into device 100.

Figure 6:
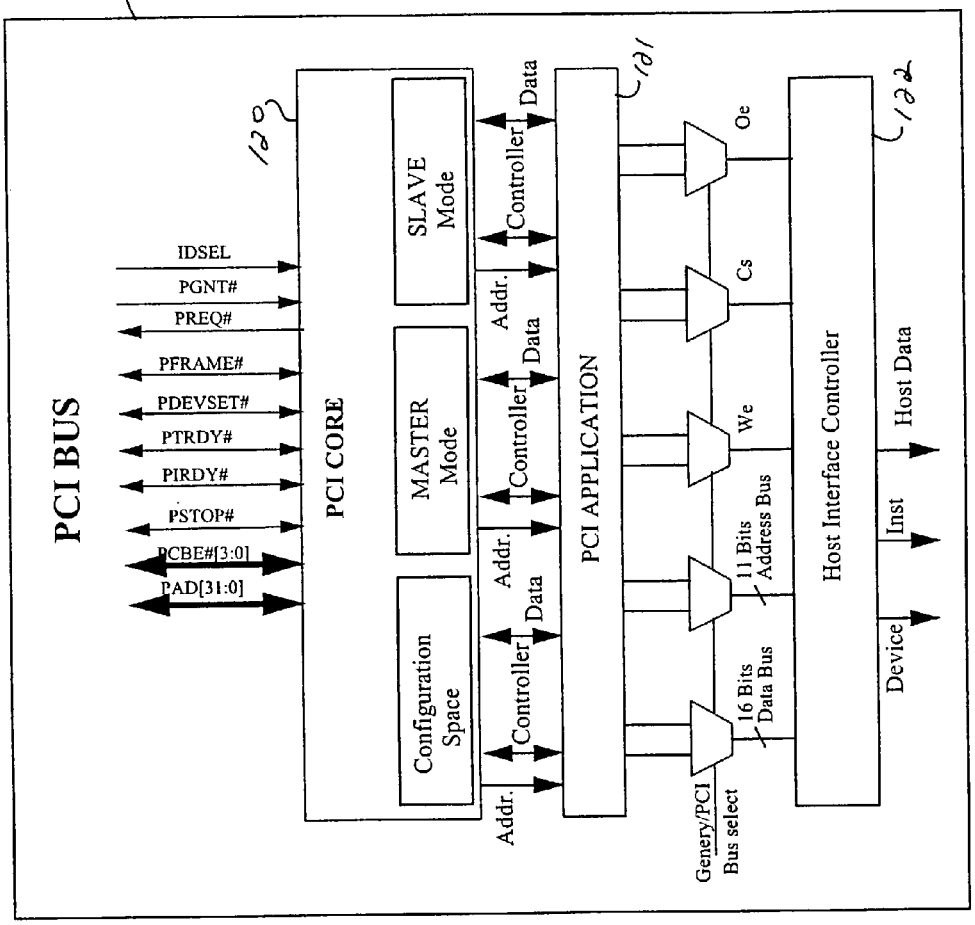
FIG. 6 is a detailed block diagram of a PCI interface of the device of FIG. 5 in accordance with an embodiment of the present invention.

The PCI interface 115 connects the single chip device 100 to a PCI bus for use in PC applications. Using the PCI interface 115, the device 100 may directly communicate with the PCI bus without the aid of an intermediate interface (chip) external to the device 100. In an embodiment of the present invention, the heart of the PCI interface 115 includes a powerful programmable DMA engine that may transfer encoded data from the device 100 to host memory without a host processor intervening. FIG. 6 is block diagram of an embodiment of the PCI interface 115 including a PCI core 120, a PCI application 121, and a host interface controller 122. The PCI core 120 provides the interface between the PCI bus and the PCI application 121. The PCI application interfaces the PCI core 120 to the host interface controller 122 and is responsible to the Master/Slave protocols and to configure PCI memory space. The PCI application 121 also includes the programmable DMA engine for transferring compressed data to Host memory. All microcodes and user defined parameters are uploaded to the single chip device 100 through the host interface controller 122 (off-line, prior to operation).

In an embodiment of the present invention, the PCI interface 115 may also support a file mode where an uncompressed file may be brought into the single chip device 100 and encoded. For example, video files stored on a PC may be converted to MPEG-2 using this method. The PCI interface 115 allows the uncompressed file to be transferred quickly to the device 100.

In an embodiment of the present invention, device 100 is operable either in a programming mode or an operational mode, and is capable of operating in both modes simultaneously.

In the programming mode, an external host transfers, via the host interface, microcodes, commands and data parameters to global controller 104. Global controller 104 transfers the microcodes, commands and data parameters to video input buffer 102, motion estimation processors 105 and 106, digital signal processor 108, memory controller 110, bitstream processor 112, I2C/GPIO interface 116, and multiplexing processor 114.

In the operational mode, video input buffer 102 is responsible for acquiring an uncompressed CCIR-656 video signal from an external video source (not shown) and storing it via the memory controller 110. In an alternative embodiment, VIB 102 captures an uncompressed video signal, via the PCI interface 115. VIB 102 is responsible for acquiring an uncompressed CCIR-656 video and storing it via the memory controller 110 in an external memory unit in a raster-scan manner.

In an embodiment of the present invention, the memory controller 110 is a SDRAM controller and the external memory unit is an SDRAM memory unit. The SDRAM controller is responsible for communication between the single chip and the external SDRAM memory unit, which is used as a frame buffer and an output buffer for compressed data. The SDRAM controller operations are controlled and scheduled by special instructions issued by the global controller 104.

Video input buffer 102 performs statistical analysis of the video signal, thereby detecting 3-2 pulldown sequences and developments in the video contents, such as scene change, sudden motion, fade in/fade out and the like. Video input buffer 102 also performs resolution downscaling, thereby allowing or enabling compression not only of the original resolution frames, but also reduced resolution frames (such as SIF, half D1 etc.). Additionally, video input buffer 102 also pre-processes the video signal, such as spatial filtering, noise reduction, image enhancement and the like. Furthermore, video input buffer 102 decreases the frame rate by decimating (dropping) frames thus allowing flexible rate control.

Video input buffer 102 accumulates the scaled and processed video data and transfers the data in bursts to an external memory unit, via memory controller 110. Memory controller 110 stores the video data in the external memory unit.

In an embodiment of the present invention, device 100 operates under MPEG video/audio compression standards. Hence, a data block represents a macroblock, which is a sixteen by sixteen matrix of luminance pixels and two, four or eight, by eight matrices of chrominance pixels as defined by MPEG standards. For purposes of clarity herein, reference to a reference frame refers to a frame that has already been encoded, reconstructed and stored in an external memory unit, and which is compared to the current frame during the motion estimation performed by motion estimation processors 105 and 106.

Motion estimation processor 105 (P4) is a level 1 motion estimation engine that is responsible for downscaling current and original reference pictures and for motion vector search. Motion estimation processor 105 finds motion vectors with a 2-pel accuracy by applying a fully exhaustive search in the range of +/−96 pels horizontally and +/−64 pels vertically.

Motion estimation processor 106 (MEF) is a level 2 motion estimation engine that is responsible for finding final (half pel) motion vectors. Additionally, the MEF performs horizontal and vertical interpolation of a chrominance signal. The MEF employs a fully exhaustive search in the range of +/−2 pels horizontally and vertically. After the full-pel motion vector is found, the MEF performs half-pel motion search in eight possible positions surrounding the optimal full-pel vector.

The dual memory controller 110 retrieves a current frame macroblock, and certain parts of the reference frames (referred hereto as search area) from the external memory unit and loads them into motion estimation processors 105 and 106. The motion estimation processors compare the current frame macroblock with the respective reference search area in accordance with a sequence of compression commands, thereby producing an estimation of the motion of the current frame macroblock. The estimation is used to remove temporal redundancy from the video signal.

Motion estimation processors 105 and 106 transfer the resulting motion estimation to global controller 104. Motion estimation processors 105 and 106 also transfer the current frame macroblock and the corresponding reference frames macroblocks to digital signal processor 108.

Digital signal processor 108 performs a series of macroblock processing operations intended to remove the spatial redundancy of the video signal, such as discrete cosine transform, macroblock type selection, quantization, rate control and the like. Digital signal processor 108 transfers the compressed data to the bitstream processor 112. Digital signal processor 108 further processes the compressed frame, thus reconstructing the reference frames, and transfers the reconstructed reference frames to the external memory unit via memory controller 110, thereby overwriting some of the existing reference frames.

Bitstream processor 112 encodes the compressed video data into a standard MPEG format, in accordance with a sequence known in the art of encoding commands. Bitstream processor 112 transfers compressed video data streams to multiplexing processor 114.

Audio encoder 113 is a processor responsible for audio encoding. In an embodiment of the present invention, audio encoder 113 supports MPEG-1 Layer II and Dolby AC-3 encoding and may be reprogrammed to support various additional audio compression schemes. The audio encoder 113 is also responsible for acquiring the uncompressed audio signal (I2S and AC97 standards are supported, for example) and buffering the compressed audio.

Multiplexing processor 114 multiplexes the encoded video and the encoded audio and/or user data streams (as received from bitstream processor 12 and audio encoder 113) and generates, according to a sequence of optimized multiplexing commands, MPEG standard format streams such as packetized elementary stream, program stream, transport stream and the like. Multiplexing processor 114 transfers the multiplexed video/audio/data streams to a compressed data stream output and to memory controller 110. Multiplexing processor 114 outputs a stream of encoded video and/or audio data.

Global controller 104 controls and schedules the video input buffer 102, the motion estimation processors 105 and 106, the digital signal processor 108, the memory controller 110, the bitstream processor 112, the I2C/GPIO interface, and the multiplexing processor 114. Global controller 104 is a central control unit that synchronizes and controls all of the internal chip units and communicates with all of the internal chip units using data-instruction-device buses.

Figure 7:
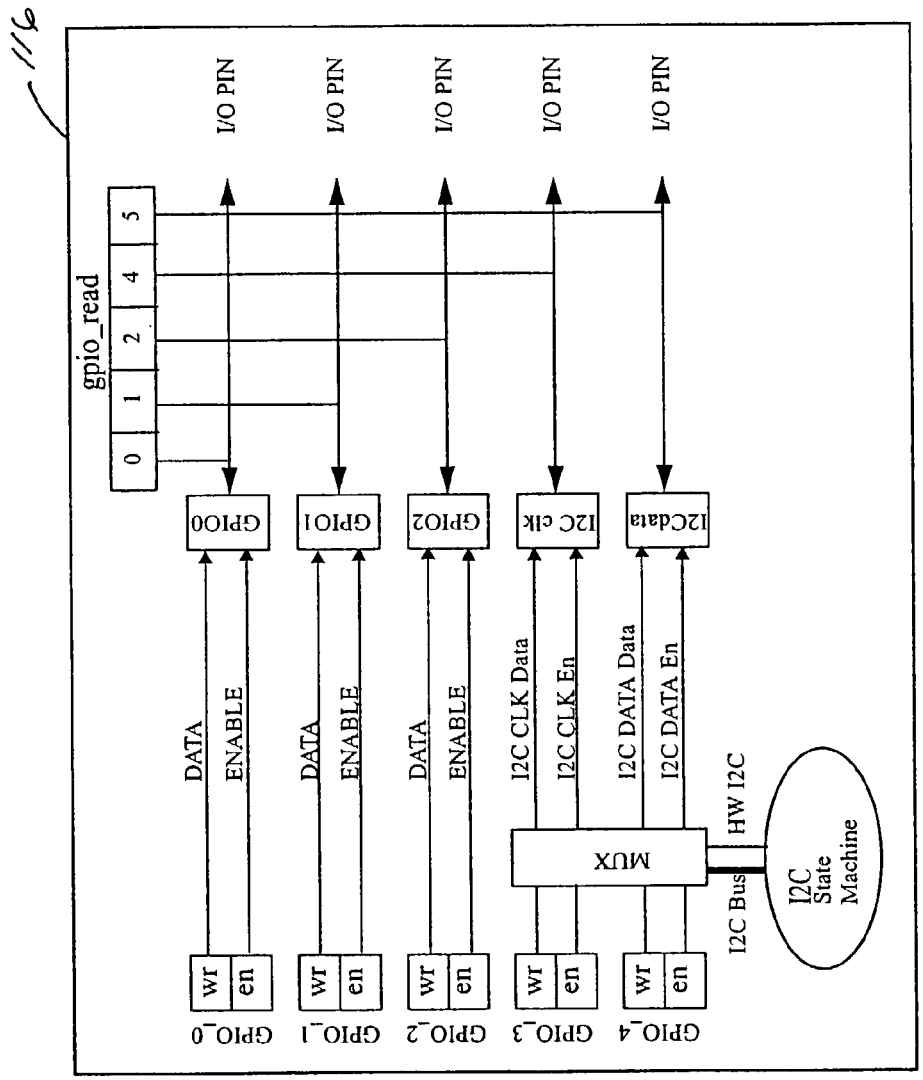
FIG. 7 illustrates a block diagram of a I2C/GPIO interface of the device of FIG. 5 in accordance with an embodiment of the present invention.

In an embodiment of the present invention, the I2C/GPIO interface 116 may be used to program an external video A/D or an external audio A/D through the single chip device 100. Any other device that is compatible with the I2C protocol may also be programmed through the device 100 using the I2C/GPIO interface 116. The I2C/GPIO interface 115 may be configured as any of multiple types of interfaces in order to communicate with other devices on the same board as the single chip device 100. In an embodiment of the present invention, the I2C/GPIO interface 115 is configured (programmed) through the host interface or global controller 104 using microcode. FIG. 7 illustrates a block diagram of the I2C/GPIO interface 116 in accordance with an embodiment of the present invention.

An embodiment of the present invention provides a digital video broadcasting (DVB) formatter 117 as part of the mux processor 114. The DVB formatter 117 enables an encoded multiplexed stream to be converted to a standard DVB format and transmitted directly from the device 100 to another chip without going through a host interface or PCI interface. The host processor does not need to get involved in the transfer of the encoded data when the DVB interface is used. The DVB interface provides a powerful and smaller interface to transfer encoded data to, for example, a CD burner or a decoder chip.

FIG. 8 is a block diagram and timing diagram illustrating the signals and timing output by the DVB formatter 117 in accordance with an embodiment of the present invention. FIG. 8 illustrates a typical system for parallel transmission of a transport stream at either constant or variable rate. The clock (CLOCK), the 8-bit data (Data), and the PSYNC signal are transmitted in parallel. The PSYNC signal marks the sync byte of the transport header and is transmitted each 188 bytes. The DVALID signal is a constant 1 in the 188-byte mode. All signals are synchronous to the clock which is set to the transport bit rate and number of bits.

An embodiment of the present invention provides a vertical blanking interval (VBI) extractor 103 as part of the VIB 102. In general, analog video data may contain user data such as closed caption information or other user information. For example, a CCIR 656 video signal may typically contain uncompressed video data in a picture interval and user data in a VBI interval. The user data is transmitted during the VBI of the video signal where picture data is not present.

The VBI extractor 103 in the VIB 102 extracts the user data from the VBI of the CCIR 656 video stream. The extracted user data is then sliced using microcode in either the mux processor 114 and inserted into the encoded stream or is sliced using microcode in the global controller 104 or BSM 112 and inserted in the unencoded stream. Slicing comprises taking the user data and breaking it up into smaller groups. For example, a picture line represented as a large number of bytes may be sliced to a smaller number of bytes.

Figure 9:
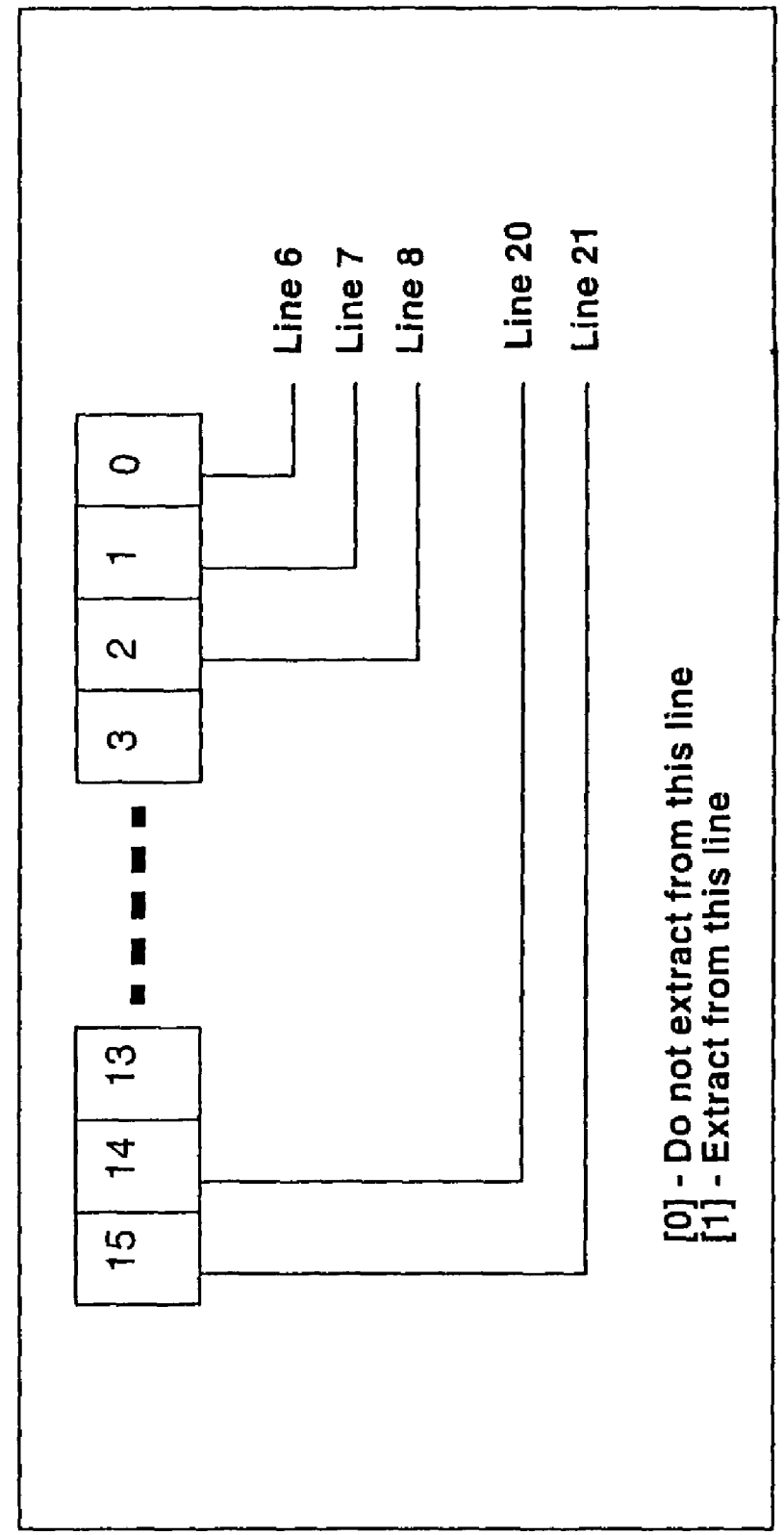
FIG. 9 illustrates how a VBI extractor of the device in FIG. 5 may extract user data from specified lines of a video signal in accordance with an embodiment of the present invention.

FIG. 9 illustrates how the VBI extractor 103 may extract user data from specified lines of a video signal in accordance with an embodiment of the present invention. Several modes may be supported by the VBI extractor 103 and subsequent slicing including a generic VBI mode. In the generic VBI mode, the user defines which pels of which video lines (e.g. of line 6 through line 21) of each field (top, bottom) are to be extracted and further transmitted in the compressed stream.

Several registers are used to control the VBI extractor 103. A first register determines the video lines of the top field to be extracted in generic VBI mode. Each bit of the first register corresponds to a certain video line (see FIG. 9). Through setting the bits of the first register, the user selects the video lines of the top field to be extracted.

A second register determines the video lines of the bottom field to be extracted in generic VBI mode. Each bit of the second register corresponds to a certain video line (see FIG. 9). Through setting the bits of the second register, the user selects the video lines of the bottom field to be extracted.

A third and fourth register determine the pixel interval within a video line of the top field of each frame to be extracted and transmitted in the compressed stream. The content of the third and fourth registers may range from 0 to 720, and a START value must be less than an END value.

A fifth and sixth register determine the pixel interval within a video line of the bottom field of each frame to be extracted and transmitted in the compressed stream. The content of the fifth and sixth registers may range from 0 to 720, and a START value must be less than an END value.

The various elements of device 100 may be combined or separated according to various embodiments of the present invention.

Also, the various elements may be implemented as various combinations of programmable and non-programmable hardware elements.

In summary, certain embodiments of the present invention afford an approach to perform video and audio encoding on a single chip to generate a stream of encoded video and audio data for use in various applications such as personal video recorders, DVD recorders, and set top box recorders. In other words, the system of the present invention enables a single chip that encodes video and audio (and any other system data desired) and generates therefrom a stream of encoded data.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A single-chip audio/video encoder device comprising, on a single integrated circuit:
   first encoder circuitry, second encoder circuitry, multiplexer circuitry, controller circuitry, and at least one bus interface;
   wherein the first encoder circuitry comprises:
      a first video encoder that receives first uncompressed video data from a first video source external to the device and produces first compressed video,
      a first audio encoder that receives first uncompressed audio data from a first audio source external to the device, and that produces first compressed audio, and
      a first memory interface that interfaces directly with first storage external to the device;
   wherein the second encoder circuitry comprises:
      a second video encoder that receives second uncompressed video data from a second video source external to the device and that produces second compressed video,
      a second audio encoder that receives second uncompressed audio data from a second audio source external to the device and that produces second compressed audio, and
      a second memory interface that interfaces directly with second storage external to the device;
   wherein the multiplexer circuitry operating in a first mode, multiplexes the first compressed video, the first compressed audio, the second compressed video, and the second compressed audio to form a first multiplexed stream operably coupled via a first output to circuitry external to the device;
   wherein the multiplexer circuitry operating in a second mode,
      multiplexes the first compressed video and the first compressed audio to form the first multiplexed stream operably coupled via the first output to circuitry external to the device, and
      multiplexes the second compressed video and the second compressed audio to form a second multiplexed stream operably coupled via a second output to circuitry external to the device;
   wherein the controller circuitry synchronizes operation of the first encoder circuitry, the second encoder circuitry, and the multiplexer circuitry; and
   wherein the at least one bus interface operably couples the controller circuitry and at least one processor external to the device.

2. The device according to claim 1, wherein the first video encoder and the second video encoder perform luminance and chrominance filtering.

3. The device according to claim 1, wherein the first storage and the second storage comprise synchronous dynamic random access memory.

4. The device according to claim 1, wherein the controller circuitry comprises a first controller that controls operation of the first video encoder, the first audio encoder, and the first memory interface, and a second controller that controls operation of the second video encoder, the second audio encoder, and the second memory interface.

5. The device according to claim 4, wherein the at least one bus interface comprises a first bus interface that operably couples the first controller and the at least one processor external to the device, and a second bus interface that operably couples the second controller and the at least one processor external to the device.

6. The device according to claim 4, wherein the at least one bus interface is configurable as a peripheral component interconnect bus interface.

7. The device according to claim 4, wherein the at least one bus interface is configurable to transfer one or both of the first multiplexed stream and the second multiplexed stream to memory of the at least one processor external to the device, as a bus master using direct memory access.

8. The device according to claim 4, wherein the at least one bus interface is configurable as a generic host interface.

9. The device according to claim 1, wherein the first video encoder, the first audio encoder, the second video encoder, the second audio encoder, and the multiplexer circuitry execute microcode instructions received by the device via the at least one bus interface.

10. The device according to claim 1, wherein each of the first uncompressed audio data and the second uncompressed audio data represent two audio channels.

11. The device according to claim 1, wherein the first video encoder and the second video encoder each comprise a motion estimation processor comprising a plurality of search processors for performing motion analysis.

12. The device according to claim 11, wherein the plurality of search processors operate in parallel, each upon a different portion of a macroblock.

13. The device according to claim 11, wherein the plurality of search processors operate in parallel upon a single macroblock, each search processor operating at a different one of a plurality of resolutions.

14. A single-chip audio/video encoder device comprising, on a single integrated circuit:
   first encoder circuitry, second encoder circuitry, multiplexer circuitry, controller circuitry, and at least one bus interface;
   wherein the first encoder circuitry comprises:
      a first video encoder that receives first uncompressed video data from a first video source external to the device and produces first compressed video, the first video encoder comprising a first motion estimation processor comprising a first plurality of search processors for performing motion analysis, and
      a first audio encoder that receives first uncompressed audio data from a first audio source external to the device, and that produces first compressed audio;
   wherein the second encoder circuitry comprises:
      a second video encoder that receives second uncompressed video data from a second video source external to the device and that produces second compressed video, the second video encoder comprising a second motion estimation processor comprising a second plurality of search processors for performing motion analysis, and a second audio encoder that receives second uncompressed audio data from a second audio source external to the device and that produces second compressed audio;

wherein the multiplexer circuitry operates in a first mode that multiplexes the first compressed video, the first compressed audio, the second compressed video, and the second compressed audio to produce a first multiplexed stream coupled via a first output to circuitry external to the device, and operates in a second mode that multiplexes the first compressed video and the first compressed audio to produce the first multiplexed stream coupled via the first output to circuitry external to the device and multiplexes the second compressed video and the second compressed audio to produce a second multiplexed stream coupled via a second output to circuitry external to the device;

wherein the controller circuitry synchronizes operation of the first encoder circuitry, the second encoder circuitry, and the multiplexer circuitry; and wherein the at least one bus interface operably couples the controller circuitry and at least one processor external to the device.

15. The device according to claim 14, wherein the device further comprises a first memory interface that interfaces the first encoder circuitry with first storage external to the device, and a second memory interface that interfaces the second encoder circuitry with second storage external to the device.

16. The device according to claim 15, wherein the first storage and the second storage comprise synchronous dynamic random access memory.

17. The device according to claim 14, wherein the first video encoder and the second video encoder perform luminance and chrominance filtering.

18. The device according to claim 14, wherein the controller circuitry comprises a first controller that controls operation of the first video encoder and the first audio encoder, and a second controller that controls operation of the second video encoder and the second audio encoder.

19. The device according to claim 14, wherein the at least one bus interface comprises a first bus interface that operably couples the first controller and the at least one processor external to the device, and a second bus interface that operably couples the second controller and the at least one processor external to the device.

20. The device according to claim 14, wherein the at least one bus interface is configurable as a peripheral component interconnect bus interface.

21. The device according to claim 14, wherein the at least one bus interface is configurable to transfer one or both of the first multiplexed stream and the second multiplexed stream to memory of the at least one processor external to the device, as a bus master using direct memory access.

22. The device according to claim 14, wherein the first video encoder, the first audio encoder, the second video encoder, the second audio encoder, and the multiplexer circuitry execute microcode instructions received by the device via the at least one bus interface.

23. The device according to claim 14, wherein each of the first uncompressed audio data and the second uncompressed audio data represent two audio channels.

24. The device according to claim 14, wherein search processors of the first plurality of search processors operate in parallel, each upon a different portion of a macroblock.

25. The device according to claim 14, wherein search processors of the first plurality of search processors operate in parallel upon a single macroblock, each search processor operating at a different one of a plurality of resolutions.

* * * * *